United States Patent
Mayhew et al.

(10) Patent No.: US 7,133,955 B2
(45) Date of Patent: Nov. 7, 2006

(54) SYSTEM AND METHOD FOR SELECTING FABRIC MASTER

(75) Inventors: David E. Mayhew, Northborough, MA (US); Todd R. Comins, Chelmsford, MA (US); Lynne M. Brocco, Cambridge, MA (US)

(73) Assignee: StarGen, Inc., Marlborough, MA (US)

( * ) Notice: Subject to any disclaimer, the term of this patent is extended or adjusted under 35 U.S.C. 154(b) by 367 days.

(21) Appl. No.: 10/660,200

(22) Filed: Sep. 11, 2003

(65) Prior Publication Data
US 2004/0131044 A1   Jul. 8, 2004

Related U.S. Application Data

(60) Provisional application No. 60/409,905, filed on Sep. 11, 2002.

(51) Int. Cl.
G06F 13/14 (2006.01)
(52) U.S. Cl. ...................... 710/305; 710/105
(58) Field of Classification Search ............ 710/104, 710/105, 110, 200, 305, 240–243; 357/257, 357/408, 432
See application file for complete search history.

(56) References Cited

U.S. PATENT DOCUMENTS 4,740,954 A * 4/1988 Cotton et al. ............... 370/408
6,160,796 A * 12/2000 Zou ............................ 370/257
6,678,781 B1 * 1/2004 Domon ....................... 710/312
6,704,819 B1 * 3/2004 Chrysanthakopoulos .... 710/240
6,910,090 B1 * 6/2005 Scheel et al. ............... 710/306

OTHER PUBLICATIONS

AS Design Issues, Bob Davis, Network Appliance, Inc., Jan. 5, 2003.*
Digging into Advanced Swiching Spec, CommsDesign, Apr. 10, 2003.*
PCI Express and Advanced Switching: Evolutionary Path to Building Next Generation Interconnects, David Mayhew et al.*
Advanced Switching for the PCI Express Architecture, Intel Corp., 2003.*
Advanced Switching Architecture, Intel Developer Forum, Sep. 17, 2003.*

* cited by examiner

Primary Examiner—Khanh Dang
(74) Attorney, Agent, or Firm—Nields & Lemack

(57) ABSTRACT

A system and method for selecting a fabric master using an announce phase and a own phase. During an announce phase a candidate master interrogates its Node Path Identifier to ensure that it has not already surrendered ownership to another node. If the candidate master has won the election, it then broadcasts its EUI with an indication that it is the new fabric master.

17 Claims, 3 Drawing Sheets

SYSTEM AND METHOD FOR SELECTING FABRIC MASTER

CROSS-REFERENCE TO RELATED APPLICATIONS

This Application claims the benefit of U.S. Provisional Patent Application No. 60/409,905 entitled "System And Method For Selecting Fabric Master" and filed Sep. 11, 2002, which is incorporated by reference herein in its entirety.

BACKGROUND OF THE INVENTION

1. Field of the Invention

This invention generally relates to the field of networks, including switch fabric networks.

2. Description of the Related Art

Switch fabric networks are generally known to one skilled in the art. An example of one is described in U.S. patent application Ser. No. 10/152,656 filed May 21, 2002, which is incorporated by reference herein in its entirety.

Generally, in a switch fabric network, a fabric master is the default destination for fabric errors and events before or in lieu of software selection. The fabric master has privileged access to the registers of all other nodes in that fabric. The fabric master also performs arbitration for shared resources in the fabric.

BRIEF SUMMARY OF THE INVENTION

In one aspect of the preferred invention, fabric master election is performed entirely in hardware and does not require software intervention. The fabric master election can take place upon power-up, after a reset, or at another time as the determined by the system or user.

BRIEF DESCRIPTION OF THE DRAWINGS

The figures below depict various aspects and features of the present invention in accordance with the teachings herein.

DETAILED DESCRIPTION OF THE INVENTION

Figure 1:
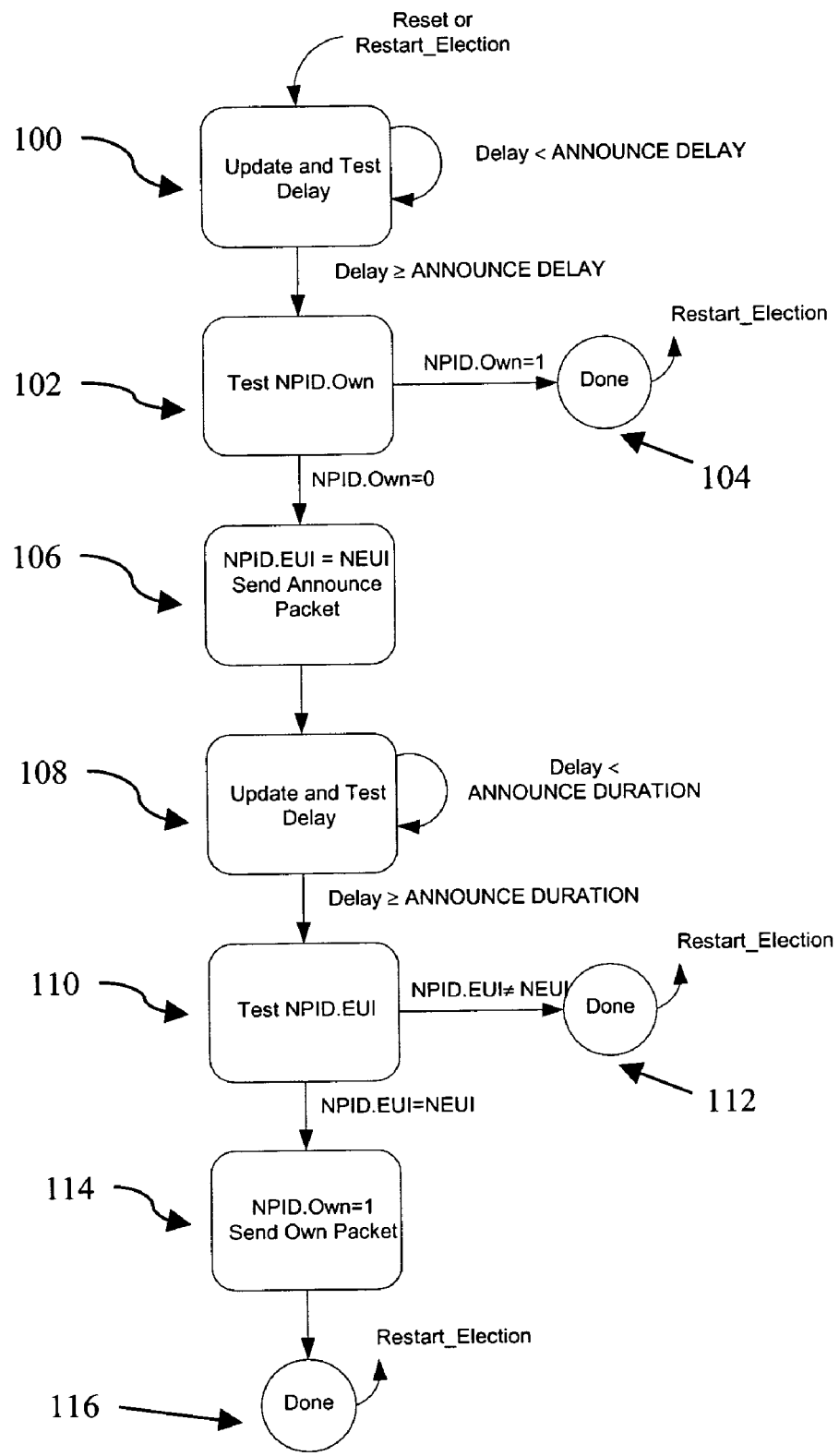
FIG. 1 is a high-level master candidate election flow diagram in accordance with one aspect of the invention.

In accordance with the present invention, a fabric master is elected from one or more candidate masters. A candidate master cannot, however, be a switch. In the event of an endpoint of the fabric, the method used to configure an endpoint to be a candidate master is implementation specific. Examples are use of a strapping pin, ROM initialization, or software CSR writes.

According to another aspect of the present invention, the master election process uses a predictable and repeatable algorithm. This novel election mechanism is flexible and allows the election of multiple fabric masters.

1. Node Identifiers

Master election involves the assignment of a unique identifier to each node in the fabric. In accordance with one aspect of the present invention, the identifier format is called the Path Identifier ("PID"). The PID assigned to a node during the master election process is called the Node PID ("NPID").

In a preferred embodiment, a PID is comprised of the following data:

1. A Path, consisting of a 40-bit Turn Pool field and a 6-bit Bit Count field.
2. An EUI, which, in the preferred embodiment is an IEEE-defined, non-volatile 64-bit Globally Unique Identifier;
3. An ownership indica.

The path component of an NPID is the path from the master to the node in question.

The EUI of the NPID is the Node EUI ("NEUI") of the elected master. The NPID also contains an Own bit which indicates whether a fabric master owns the node.

The NPID is contained in the NPID register in the node's control status registers ("CSRs"). A node may support multiple fabric masters (primary, secondary, etc), and must contain an NPID register for each master supported. The PID Index selects one of multiple PIDs. The format of the NPID register is shown in Table 1.

TABLE 1

NPID Register Format

| [31:24] | | | | | | | | [23:16] | | | | | | | | [15:8] | | | | | | | | [7:0] | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Turn Pool [7:0] | | | | | | | | O | R | Bit Count [5:0] | | | | | | PID Index | | | | | | | | Reserved [11:0] | | | | | | | |
| | | | | | | | | Turn Pool [39:7] | | | | | | | | | | | | | | | | | | | | | | | |
| | | | | | | | | EUI[31:0] | | | | | | | | | | | | | | | | | | | | | | | |
| | | | | | | | | EUI[63:32] | | | | | | | | | | | | | | | | | | | | | | | |

O: Own
R: Reserved

The NPID Register is a 128-bit register. The register contains a 12-bit field reserved for special codes, a 4-bit PID Index field, a 6-bit Bit Count field, a 1-bit Reserved field, a 1-bit Own field, a 40-bit Turn Pool field, and a 64-bit EUI field.

All fields of the NPID register have read-only access from software. Preferably, the PID Index is hardwired and not modified by either hardware or software. The fields Bit Count, Turn Pool, EUI, and Own bit are modified by hardware during the master election process, or during a PID reset operation.

2. Fabric Master Election Process

In order to perform a NPID assignment, the fabric must contain one or more nodes that are capable of being a master.

A master candidate is a node that is master-capable but has not yet been selected to be a fabric master. The fabric master election process selects a fabric master from among the master candidates.

In the preferred embodiment the fabric master election procedure is a distributed arbitration process, where each candidate master determines the outcome of its arbitration attempt.

The following assumes single fabric master selection but also applies to multiple fabric master selection as well. Multiple masters and NPIDs are discussed in greater detail below in Section 5 below.

a. Process Overview

The master election procedure is comprised of an "announce" phase and an "own" phase. These phases occur at and are defined individually by each candidate master. During the announce phase, the candidate masters vie for ownership of the fabric. At the end of the announce phase, each candidate master determines whether it has been elected. The own phase only occurs if the candidate master is elected, where the elected fabric master declares itself as the fabric master to all the nodes in the fabric.

During the announce phase, a candidate master interrogates its NPID to ensure that the candidate master has not already surrendered mastership to another candidate master and to ensure that an announcement has not already been received from a candidate master with a smaller EUI. If either of these conditions are true, then the associated node is no longer a candidate master. If both checks fail, then the candidate master initializes its NPID register to contain its own NEUI, and then attempts to broadcast its NEUI to all the other nodes in its fabric using a blind broadcast packet. Blind broadcast packets leave their root nodes with empty turn pools and zeroed bit counts. Switches in the fabric construct paths within blind broadcast packets when forwarding the blind broadcast packets by rotating the turn pool and placing the relative port number out which the switch is forwarding the packet in the shift-in bits of the turn pool. This results in the dissemination of paths from the eventual owning candidate master to all the other nodes in the fabric. Switches perform a filtering operation on the packets they receive such that only one candidate master's information is selected at each node.

After the announce phase, the candidate master nodes check their NPID register. If the NPID register still contains the candidate master's NEUI, that candidate master has won the election and is eligible to own the fabric. If the NPID register has been updated and contains another master's NEUI, then the candidate master has lost the election.

If the candidate master has won the election, it broadcasts its EUI again, with the Own operation specified. The switches again perform a path building and filtering operation. The filtering operation selects the shortest path (defined to be the path with the smallest active turn pool partition) between the node and the master and provides repeatability of results. As a result of the Own broadcast, all nodes set their ownership bits, along with the fabric master's NEUI and path information.

Reference is now made to the figures below which show aspects of the candidate master election flow.

b. Announce Phase i. Announce Phase—Candidate Masters

Reference is now made to FIG. 1. Candidate masters start the fabric master election process by initiating an announce phase. Each candidate master starts and ends its announce phase independently of other candidate masters based on two delay times. The first delay time, called the Announce Delay, is the time between the completion of reset and start of the announce phase. The second delay time, called the Announce Duration, specifies the duration of the announce phase. The Announce Delay may vary among candidate masters, and can be used to set a preference for some candidate masters over others. See Section 5 for more details on multiple fabric masters.

After a reset of a software or hardware call to restart the election process, at block 100 a candidate master delays until the predetermined Announce Delay has passed.

Once passed, at Block 102 a candidate master tests its Own bit. It can only start the announce phase if the Own bit of its NPID is clear, that is, it is not already owned. If the NPID.Own bit is set, the master election process is terminated (Block 104).

When Announce Delay time is reached, and if the NPID.Own bit is clear and its NPID.EUI is larger than its NEUI, the candidate master may proceed with the Announce phase. In this phase, the candidate master initializes its NPID register by setting its NPID.EUI value to NEUI, and sets its Turn Pool field bits to all 0's and the Bit Count field bits to all 1's. The candidate master then announces itself to the nodes in the fabric by sending a broadcast packet to all the nodes indicating that it is announcing itself (the "Announce Packet"). In the preferred embodiment, the candidate master sends a blind broadcast packet with the Operation field set to Announce.

The Announce Packet contains the NPID information of the candidate master, called the Packet PID ("PPID"). Once the Announce Packet is sent, the candidate master waits for an amount of time equal to the Announce Duration (Block 108).

The Announce Duration is typically, but not required to be, the same for all candidate fabric masters. The Announce Duration defines the length of the Announce phase for that candidate master, and allows a time period for multiple fabric masters to perform the announce operation before the master candidate determines the result of the election. The Announce Duration is based on the latency of the broadcast operation across the fabric. The recommended Announce Duration is approximately 10 times the maximum broadcast latency in the fabric, although other times can be used.

The Announce Delay and Announce Duration is obtained from the Announce Phase Control register. The format of this register is shown in Table 2. The fields have software read/write access, and can also be initialized through serial ROM preload or other device specific means. Typically, however, master election is performed before software initialization.

TABLE 2

Announce Phase Control Register Format

| [31:24] | [23:16] | [15:8] | [7:0] |
|---|---|---|---|
| 7 6 5 4 3 2 1 0 | 7 6 5 4 3 2 1 0 | 7 6 5 4 3 2 1 0 | 7 6 5 4 3 2 1 0 |
| Duration Amount | Duration Scale | Delay Amount | Delay Scale |

The Duration Amount is an 8-bit field and Duration Scale is a 4-bit field. These determine and indicate the Announce Duration used by the candidate master. The Delay Amount is an 8-bit field and the Delay Scale is a 4-bit field and indicate the Announce Delay used by the candidate master.

Once the candidate master has waited for a duration greater than the Announce Duration, it tests its EUI to see if it is equal to NEUI (Block 110). If not, the master election is terminated for that node (Block 112).

If the candidate master's EUI is equal to the NEUI, then the candidate master sets its Own bit to 1 (Block 114), sends out an Own packet and terminates the master election process (Block 116).

ii. Announce Phase—Switches

Figure 2:
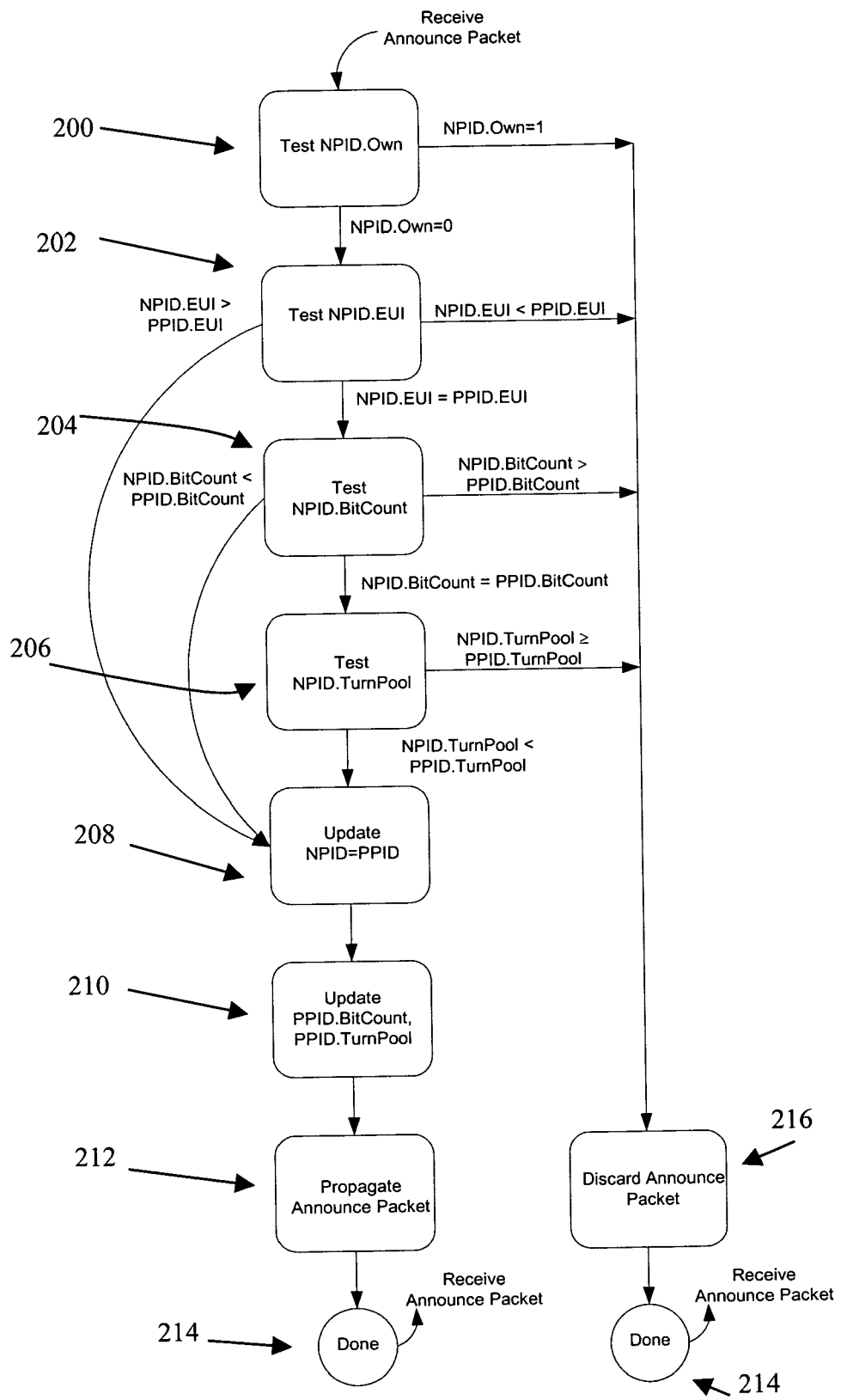
FIG. 2 is a high-level filtering and propagation of Announce packets flow diagram in accordance with one aspect of the invention.

The election of the fabric master is essentially performed in a distributed fashion by the switches as they filter Announce packets, either discarding or propagating them after they are received. Switches must be able to handle multiple Announce packets (or any other combination of blind broadcast packets) arriving in succession on either the same or different ports; that is, it must be able to handle back-to-back blind broadcast packets. The Announce packet filter algorithm is depicted in FIG. 2.

A. Filtering Announce Packets

The switch performs the filtering operation by comparing the PPID (packet PID) to its NPID (Node PID). The NPID of each node is set to the following default values after reset:
NPID.TurnPool=0
NPID.BitCount=0
NPID.EUI=MAX_EUI (all 1's)
NPID.Own=0

When a switch receives an Announce packet, it checks if its NPID.Own is set (Block 202). If the NPID.Own bit is set, the fabric is already owned and the switch discards the packet and does not forward it (Block 216). The NPID remains unchanged.

If the NPID.Own bit is clear, there is not yet a fabric master. The switch compares the EUI field of the packet's PPID to the EUI of its NPID (Block 202). In order to avoid vendor preference since the upper bits of the EUI are a vendor ID, a bit order reversal (referred to a the EUI swizzle) operation is performed on both the NPID.EUI and the PPID.EUI before they are compared. This operation is only used for the compare operation and is not reflected in the value that is stored in the NPID register or used in the packet.

If the swizzled NPID.EUI is a lower value than the swizzled PPID.EUI, the switch retains the current NPID value, discards the packet and does not forward it (Block 216). This means a different candidate master with a lower EUI previously sent an Announce packet, and beats the subsequent candidate master in the comparison. Smaller EUI values win arbitration over larger EUI values. If the NPID.EUI is a higher value than the PPID.EUI, the switch stores the PPID into its NPID register (Block 208). That is, the candidate master that sent this Announce packet has won this round of arbitration. Because the packet uses the Announce operation, the NPID.Own bit remains 0. The switch then propagates the Announce packet (Block 212) as described in Section 2.b.ii.B (Propagating Blind Broadcast Packets)

If the PPID.EUI is equal to the NPID.EUI, both EUIs belong to the same candidate master, however multiple Announce packets have traveled to the switch via different paths. A switch chooses the shortest path when multiple Announce packets are received. This comparison also provides repeatability and predictability over multiple master elections. To perform the shortest path comparison, the PPID.BitCount of the PPID is compared to the NPID.BitCount (Block 204). Since the BitCount counts from a higher to a lower value as a path is traversed, a higher BitCount indicates a shorter path. If the PPID.BitCount is lower, the current NPID is retained and the Announce packet is discarded (Block 216). If the PPID.BitCount is lower, the switch stores the PPID into its NPID register (Block 208). The switch then propagates the Announce packet (Block 212) as described in Section 2.b.ii.B (Propagating Blind Broadcast Packets).

If the BitCounts are equal, the TurnPool is compared (Block 206). Comparing the turn pool guarantees a repeatability of results over multiple elections, given the same fabric topology. If the PPID.TurnPool is lower than or equal to the NPID.TurnPool, the current NPID is retained and the Announce packet is discarded (Block 216). If the PPID.TurnPool is lower, the switch stores the PPID into its NPID register. The switch then propagates the Announce packet (Block 212) as described in Section 2.b.ii.B (Propagating Blind Broadcast Packets).

B. Propagating Blind Broadcast Packets

As a blind broadcast packet moves through the switches in the fabric, the path is constructed such that a complete path from the initiator to the target node is contained in the packet when the packet reaches the target. Also, at each switch the path contained in the packet is the path from the initiator to that switch.

When a switch propagates a blind broadcast packet, such as an Announce packet or an Own Packet, it forwards the packet out all of its ports, with the exception of the input port. Before it sends the packet, it performs a path building operation on the packet header.

Path construction involves calculating the turn taken by the switch, and updating the BitCount. The BitCount update is the same for each of the packets forwarded by the switch, however the TurnPool varies based on the output port.

The path construction operation is dependent on the number of ports the switch has. The Bit Count is decremented by the number of bits required to specify the possible turns, or possible output ports, in the switch, as shown in Table 3. The number of turns is always one less than the total number of ports on the switch.

TABLE 3

BitCount Operation

| Number of Turns | Number of Ports | Turn Bit Width (Subtract from BitCount) |
|---|---|---|
| 2 | 3 | 1 |
| 3–4 | 4–5 | 2 |
| 5–8 | 6–9 | 3 |
| 9–16 | 10–17 | 4 |
| 17–32 | 18–33 | 5 |
| 33–64 | 34–65 | 6 |

The turn is the output port position relative to the input port position, starting at 0. That is, the turn is (output_port–input_port–1). If the output port number is less than the input port number, the turn is ((output_port+$2^{turn\_bit\_width}$+1)–input_port–1. The Turn Pool is shifted LSB to MSB by the Turn Bit Width. The new turn value is shifted into the LSB of the Turn Pool, zero extended if necessary.

iii. Announce Phase—Endpoints

When an endpoint receives an Announce packet, it performs the same filtering operation as the switch, as described in Section 2.b.ii.A (Filtering Announce Packets). An endpoint never propagates an Announce packet, it either ignores it or load its NPID with the PPID. Master candidates also perform these operations when an Announce packet is received. A summary of the filtering operation is listed below:

1. NPID.Own check
   If NPID.Own is set, ignore Announce packet
   If NPID.Own is clear, perform NPID.EUI comparison
2. NPID.EUI comparison
   If swizzled NPID.EUI is less than swizzled PPID.EUI, ignore Announce Packet
   Else if swizzled NPID.EUI is greater than swizzled PPID.EUI, set NPID=PPID
   Else if swizzled NPID.EUI is equal to swizzled PPID.EUI, perform NPID.BitCount comparison
3. NPID.BitCount comparison
   If NPID.BitCount is greater than PPID.BitCount, ignore Announce Packet
   Else if NPID.BitCount is less than PPID.BitCount, set NPID=PPID
   Else if NPID.BitCount is equal to PPID.BitCount, perform NPID.TurnPool comparison
4. NPID.TurnPool comparison
   If NPID.TurnPool is greater than or equal to PPID.TurnPool, ignore Announce Packet
   Else if NPID.TurnPool is less than PPID.TurnPool, set NPID=PPID Again, since the Operation is Announce, the Own bit is set to 0 for the cases where the NPID is set to the PPID.

c. Own Phase

As with the Announce Phase, the timing of the Own Phase is determined by each individual candidate master. The Own Phase for a candidate master starts when the Announce Duration has expired.

i. Own Phase—Elected Master

When the Announce Duration expires for a candidate master, the candidate master checks its NPID register. If the NPID register does not contain its NEUI, another master has won the election and the node is not eligible to own the fabric. The candidate master does not initiate any further action with respect to master election.

If the NPID register still contains the NEUI, then the candidate master has won master election. The elected master sets its NPID.Own bit in its NPID register. The elected master informs the rest of the nodes that it owns the fabric through a blind broadcast packet with an Operation of Own (Own packet).

ii. Own Phase—Switch Filtering and Propagation

Figure 3:
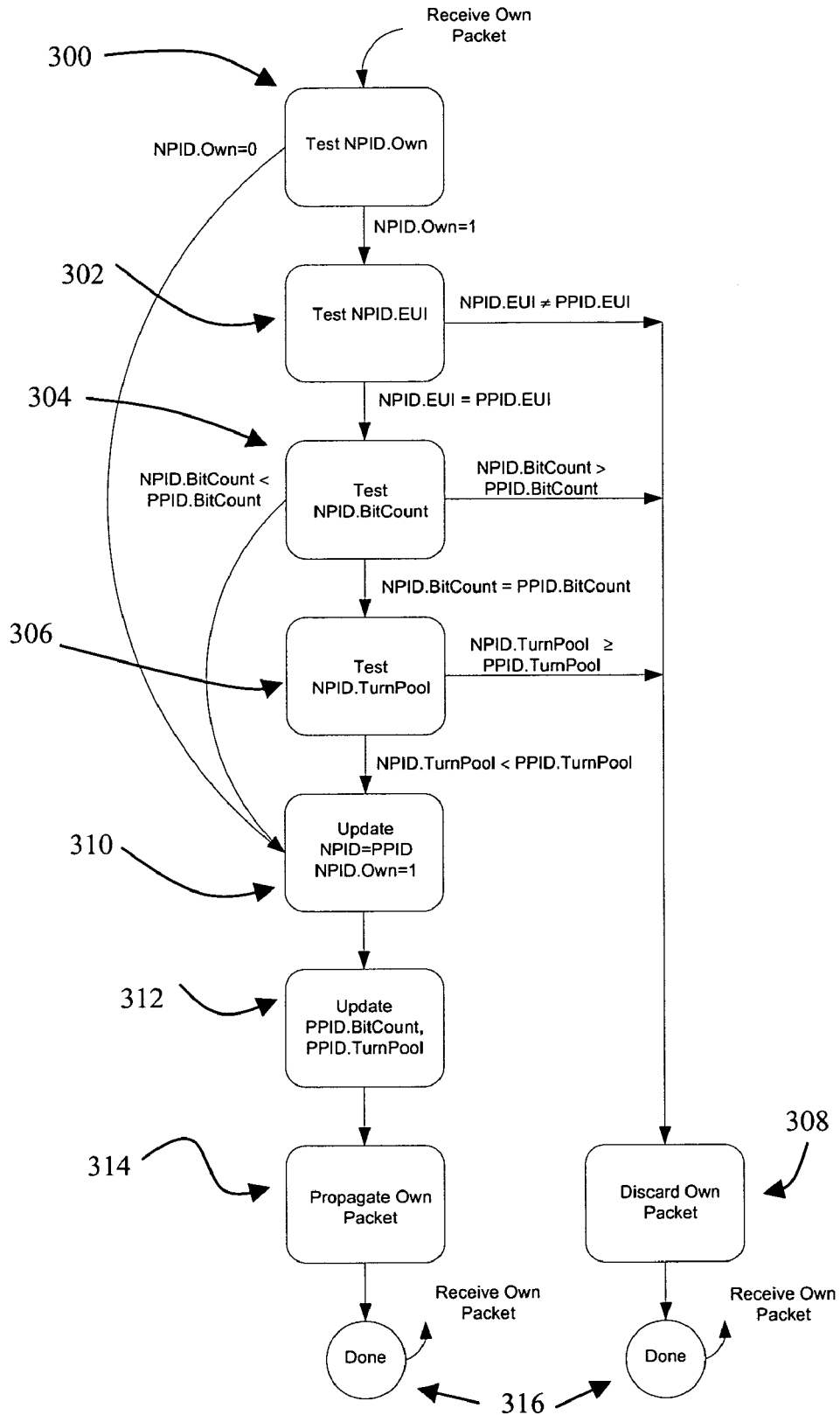
FIG. 3 is a high-level Own Packet Propagation and Filtering flow diagram in accordance with one aspect of the invention.

Switches must still filter Own packets to ensure that only one master ends up owning the fabric. The filtering operation is shown in FIG. 3. When a switch receives an Own packet, it checks the NPID.Own bit in the NPID register (Block 300). If the NPID.Own bit is clear, it sets the bit and loads the NPID register with the PPID from the packet (Block 310) AND UPDATES PPID.BitCount and PPDID.TurnPool (Block 312). The switch then propagates the packet as described in Section 2.b.ii.B (Propagating Blind Broadcast Packets)(Block 314). If the NPID.Own bit is set, the PPID.EUI is compared against the NPID.EUI (Block 302). If the EUI's are different, another master owns the switch and the Own packet is discarded (Block 308).

If the NPID.EUI is equal to the PPID.EUI, the BitCount of the two PIDs are compared to select the shortest path (Block 304). If the NPID.BitCount is less than the PPID.BitCount, the PPID is stored in the NPID register and the packet is forwarded (Block 310–314). If the NPID.BitCount is greater than the PPID.BitCount, the packet is discarded (Block 308).

If the two BitCounts are equal, the TurnPool of each PPID is compared (Block 306). This provides repeatability of results. If the NPID.TurnPool is less than the PPID.TurnPool, the NPID is loaded with the PPID information and the Own packet is propagated (Block 310–314). Otherwise, the Own packet is discarded (Block 308).

iii. Own Phase—Endpoints

When an end node receives an Own packet, it unconditionally updates its NPID with the PPID information from the packet. The Own bit of the NPID is set to 1. The unconditional load guarantees that the endpoint is owned by the same fabric master as the switch to which it is connected.

3. Reassigning Fabric Ownership

A fabric master may relinquish ownership of the fabric to allow reassignment of a master. When a fabric master relinquishes ownership, it sends a Blind Broadcast packet with an operation of PID Reset. It also resets its own NPID register to its default values, including clearing the NPID.Own bit.

Only the elected fabric master can reset a node's NPID, with the exceptions noted in Section 5. When a node receives a PID Reset packet, it compares the PPID.EUI of the packet to the NPID.EUI. If they match, the node's NPID is reset to the default value. If the node is a switch, it performs the path building operation and propagates the Reset PID packet. If the PPID.EUI does not match the NPID.EUI, the NPID is unchanged, the node discards the packet, and switches do not forward it.

Once the Reset NPID packet propagates through the fabric, new candidate master nodes may start an Announce phase to elect a new fabric master. The mechanism by which master election is restarted can done by a variety of mechanisms known by one skilled in the art.

A fabric master should never receive a Reset NPID packet with a PPID.EUI equal to its NPID.EUI. This means another node sent the packet with the master's EUI. The fabric master may choose to perform an error notification when this occurs. The path of the Reset NPID packet then identifies the node that sent the erroneous packet.

4. Fabric Pruning

If a fabric is constructed that exceeds the reach of the turn pool, some nodes may be located outside the maximum reach of the fabric master. This means that the fabric master and the outlying nodes cannot communicate using the NPID information.

The existence of outlying nodes is considered an error case for the fabric. These outlying nodes are removed, or pruned, from the fabric from a configuration and error reporting perspective.

A switch is pruned from the fabric if it receives a blind broadcast packet that is not discarded after the filter operation, and the PPID.BitCount minus the turn width is less than 23. An endpoint is pruned from the fabric if it receives a blind broadcast packet with the PPID.BitCount less than 23. A switch that receives a pruning blind broadcast packet updates its NPID register with the PPID information, but the NPID.BitCount is set to 22. The switch propagates the packet with an PPID.BitCount equal to 22, even if it is pruned. BitCount=22 is the error code for a pruned node. Pruned switches and endpoints continue to filter and propagate blind broadcast packets as they are received. It is possible that a subsequent blind broadcast packet may "unprune" the node and bring it back into the fabric.

When a node is pruned from the fabric (NPID.BitCount=22), it cannot report errors or initiate any type of traffic other than propagation of blind broadcast packets.

Subsequent to fabric pruning, post-initialization software may attempt to merge these nodes back into the fabric. For example, re-election of a fabric master may result in a fabric master that is able to reach all nodes. However, there will still be nodes that will not be able to communicate each other because the path between then exceeds the reach of the turn pool.

5. Multiple Fabric Masters

Some fabric may desire multiple fabric masters. For example, a high availability system may require a primary and secondary fabric master to avoid single points of failure. The primary fabric master could perform a controlled hand-off to a secondary fabric master, or the secondary fabric master can take over when the primary fails. Failure detection methods are implementation specific. Also, different fabric masters could perform different functions.

In one embodiment of the present invention the protocol supports up to 16 fabric masters. A separate NPID register must be implemented for each fabric master supported. The PID Index in the blind broadcast packet indicates the NPID upon which the filter and store operations are performed. For example, a primary fabric master could use PID Index 0 and a secondary fabric master could use PID Index 1.

Election of fabric masters using different PID Indexes are orthogonal to each other, and may occur serially or concurrently. There is no timing relationship between the master elections of different NPIDs; a node must support separate arbitration logic for each NPID. A candidate master may vie for the ownership of one or more PIDs. How a candidate master determines which PID to arbitrate for is implementation specific. If it is arbitrating for multiple PIDs, the candidate master must implement an Announce Phase Control register for each NPID, and must track the Announce Delay and Announce Duration for each PID Index separately.

NPID[0] and NPID[1] have special properties around NPID Reset. The master of NPID[0]can reset any NPID of that node. The master of NPID[1] can reset any NPID of that node. However, the master of any other NPID (2 through 15) can only reset that NPID. That is, the master of NPID[2] can only reset NPID[2].

For example, if a node receives a Reset PID packet with a PID Index of 6, in order to reset NPID[6] the PPID.EUI must match either NPID.EUI[1], NPID.EUI[1], or NPID.EUI[6]. If a node receives a Reset PID packet with a PID Index of 1, in order to reset NPID[1], the PPID.EUI must match either NPID.EUI[0] or NPID.EUI[1].

6. Fast Master Election

Varying the Announce Delay among nodes can provide a preference for one or more master candidates to win master election. It also provides a faster system startup option. The Announce Duration may also be shortened to reduce the amount of time between the start of the Announce phase and the Own phase.

Nodes that have shorter Announce Delays relative to other nodes are fast arbiters. The designation of a fast arbiter relative to slow arbiters is implementation specific. Once a fast arbiter has announced and owned the fabric, a slow arbiter cannot win even if it has a lower EUI.

Having now described preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, RAM, ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner. For illustrative purposes the present invention is embodied in the system configuration, method of operation and product or computer-readable medium, such as floppy disks, conventional hard disks, CD-ROMs, Flash ROMs, nonvolatile ROM, RAM and any other equivalent computer memory device. It will be appreciated that the system, method of operation and product may vary as to the details of its configuration and operation without departing from the basic concepts disclosed herein.

In the manner described above, the present invention thus provides a system and method to select a fabric master. While this invention has been described with reference to the preferred embodiments, these are illustrative only and not limiting, having been presented by way of example. Other modifications will become apparent to those skilled in the art by study of the specification and drawings. It is thus intended that the following appended claims include such modifications as fall within the spirit and scope of the present invention.

What we claim is:

1. A system for selecting a fabric master comprising: a candidate master having a memory element; said memory element storing a path identifier comprising an EUI and an ownership indicia; a first delay indicia associated with said candidate master representing an announce delay; and a second delay indicia associated with said candidate master representing an announce duration.

2. The system of claim 1, wherein said candidate master further comprises: a second memory element storing a NEUI; a transmitter adapted to send announce packets in response to a first predetermined condition and to send own packets in response to a second predetermined condition.

3. The system of claim 2, wherein said first condition comprises said ownership indicia indicating said fabric is not owned and said NEUI having higher priority than said EUI.

4. The system of claim 2, wherein second condition comprises said EUI being equal to said NEUI.

5. A method for selecting a fabric master by a candidate master, said candidate master comprising a memory element storing an EUI and a NEUI, said method comprising: waiting for at least a first delay indicia representing an announce delay; performing a first test of an ownership indicia; performing a second test using said candidate master's EUI against said candidate master's NEUI; and sending an announce packet if results of first test indicates that said candidate master has not yet surrendered mastership and if results of said second test indicates that said candidate master's has not received an announcement from a second candidate master with a higher priority.

6. A method of selecting a fabric master according to claim 5 further comprising: waiting for at least a second delay indicia representing an announce duration; performing a third test using said candidate master's EUI against candidate master's NEUI; and sending an own packet if said third test indicates that said candidate master's has not received an announcement from a second candidate master with a higher priority.

7. The method of claim 5 wherein said first test comprises testing the state of said ownership indicia such that if said indicia is not asserted, said master candidate has not surrendered mastership.

8. The method of claim 5 wherein said second test comprises comparing said candidate master's EUI against said candidate master's NEUI such that if said NEUI has higher priority than said EUI, said master candidate has not received an announcement from a second candidate master with a higher priority.

9. The method of claim 6 wherein said third test comprises comparing said candidate master's EUI against said candidate master's NEUI such that if said EUI is equal to said NEUI, said master candidate has not received an announcement from a second candidate master with a higher priority.

10. A method of selecting a fabric master by a switch within said fabric, said switch comprising an ownership indicia and a memory element storing an EUI, said method comprising: receiving a first packet, known as an announce packet from a candidate master, said packet having a first field representing an EUI; performing a test of said ownership indicia; and if said test indicates that said fabric is not owned, comparing said switch's EUI with said announce packet's EUI; updating said switch's EUI with announce packet's EUI and propagating said announce packet in the event of predetermined conditions, otherwise discarding said announce packet.

11. A method of claim 10 wherein said memory element in said switch further comprises a bit count, said announce packet further comprises a second field representing a bit count and said predetermined conditions comprise said switch's EUI being equal to said announce packet's EUI and comparing said switch's bit count being less than said announced packet's bit count.

12. A method of claim 10 wherein said memory element in said switch further comprises a turn pool, said announce packet further comprises a second field representing a turn pool, and said predetermined conditions comprise said switch's EUI being equal to said announce packet's EUI and said switch's turn pool being greater than said announced packet's turn pool.

13. A The method of claim 10 further comprising: receiving a second packet, known as an own packet, said own packet comprising a field representing an EUI; comparing said switch's EUI with said own packet's EUI; updating said switch's EUI with own packet's EUI and propagating said own packet in the event of second predetermined conditions, otherwise discarding said own packet.

14. A method of claim 13 wherein said memory element in said switch further comprises a bit count, said own packet further comprises a second field representing a bit count and said second predetermined conditions comprise said switch's EUI being equal to said own packet's EUI and said switch's bit count being less than said own packet's bit count.

15. A method of claim 13 wherein said memory element in said switch further comprises a turn pool, said own packet further comprises a second field representing a turn pool, and said second predetermined conditions comprise said switch's EUI being equal to said own packet's EUI and said switch's turn pool being greater than said own packet's turn pool.

16. The method of claim 10 wherein said predetermined conditions comprise said announce packet's EUI having a higher priority than said switch's EUI.

17. The method of claim 13 wherein said second predetermined conditions comprise said own packet's EUI having a higher priority than said switch's EUI.

* * * * *